United States Patent
Furuta (10) Patent No.: US 7,331,760 B2
(45) Date of Patent: Feb. 19, 2008

(54) FAN REVOLUTION SPEED CONTROL METHOD

(75) Inventor: Hideto Furuta, Tokyo (JP)

(73) Assignee: Shin Caterpillar Mitsubishi Ltd., Tokyo (JP)

(*) Notice: Subject to any disclaimer, the term of this patent is extended or adjusted under 35 U.S.C. 154(b) by 557 days.

(21) Appl. No.: 10/519,905

(22) PCT Filed: Mar. 18, 2004

(86) PCT No.: PCT/JP2004/003675

§ 371 (c)(1),
(2), (4) Date: Dec. 28, 2004

(87) PCT Pub. No.: WO2005/014987

PCT Pub. Date: Feb. 17, 2005

(65) Prior Publication Data

US 2005/0207899 A1    Sep. 22, 2005

(30) Foreign Application Priority Data

Aug. 8, 2003    (JP)    ............................ 2003-290343

(51) Int. Cl.
*F01P 7/04*      (2006.01)
*F01P 11/16*    (2006.01)

(52) U.S. Cl. ............................ 416/1; 416/37; 416/38; 416/39; 416/44; 60/456; 123/41.12; 700/41; 700/304

(58) Field of Classification Search .................... 416/1, 416/25, 28–31, 36–38, 39, 44, 47–48; 415/1, 415/13, 17, 19, 30, 47, 49–50; 417/364, 417/390; 60/456; 123/41.02, 41.11, 41.12, 123/41.49; 700/41, 304
See application file for complete search history.

(56) References Cited

U.S. PATENT DOCUMENTS 6,481,388 B1 * 11/2002 Yamamoto ............... 123/41.12

(Continued)

FOREIGN PATENT DOCUMENTS

JP        53-079175        7/1978

(Continued)

OTHER PUBLICATIONS

Patent Abstracts of Japan for JP2000-110560 published on Apr. 18, 2000.

(Continued)

*Primary Examiner*—Christopher Verdier
(74) *Attorney, Agent, or Firm*—Darby & Darby P.C.

(57) ABSTRACT

Actual temperatures of intake air, hydraulic oil, and coolant, to be cooled by a cooling fan, are detected. Target fan revolution speeds are determined by PI control units based on differences between the actual temperatures and target temperatures. The cooling fan is controlled based on the target fan revolution speeds. To restrict accumulation of negative integral elements when performing integration by the PI control units an integration start control system adapted to control the timing for each PI control unit to initiate integration is provided. Target temperatures for initiating integration are respectively set, and control is performed so that integral elements of each PI control unit are kept invalid until the actual temperature of the corresponding cooling target fluid, i.e. the intake air, the hydraulic oil, or the coolant, reaches the corresponding target temperature. Delay in rise of fan revolution speed is prevented.

3 Claims, 7 Drawing Sheets

U.S. PATENT DOCUMENTS 7,275,368 B2 * 10/2007 Furuta et al. .................. 60/329
7,281,370 B2 * 10/2007 Furuta et al. .................. 60/329

FOREIGN PATENT DOCUMENTS

JP          60-193010          10/1985
JP          2000-110560        4/2000

OTHER PUBLICATIONS

Patent Abstracts of Japan for JP53-079175 published on Jul. 13, 1978

Patent Abstracts of Japan for JP60-193010 published on Oct. 1, 1985.

* cited by examiner

PRIOR ART

FAN REVOLUTION SPEED CONTROL METHOD

CROSS-REFERENCE TO PRIOR APPLICATION

This is a U.S. national phase application under 35 U.S.C. §371 of International Patent Application No. PCT/JP2004/003675 filed in Japanese on Mar. 18, 2004 and claims the benefit of Japanese Patent Application No. 2003-290343 filed Aug. 8, 2003 both of which are incorporated by reference herein. The International Application has not been published as of the date of filing of this application.

TECHNICAL FIELD

The present invention relates to a fan revolution speed control method for controlling a number of revolutions per unit period of time of a cooling fan. In the explanation hereunder, such a number of revolutions is referred to as "revolution speed".

BACKGROUND OF THE INVENTION

In some conventional fan revolution speed control methods, variable control of the number of revolutions of a cooling fan is performed by a process comprising steps of detecting an actual temperature of cooling target fluid, i.e. fluid to be cooled by the cooling fan, such as hydraulic oil and circulating radiator cooling water for cooling an engine (such cooling water is hereinafter referred to as coolant), determining a target fan revolution speed by a system of a proportional integral control unit based on the difference between the actual temperature detected and a target temperature, and changing the fan revolution speed based on the target fan revolution speed so as to bring the actual temperature of the cooling target fluid down to the target temperature. One example of such control methods is disclosed in Japanese Patent Publication No. 3295650.

Figure 7:
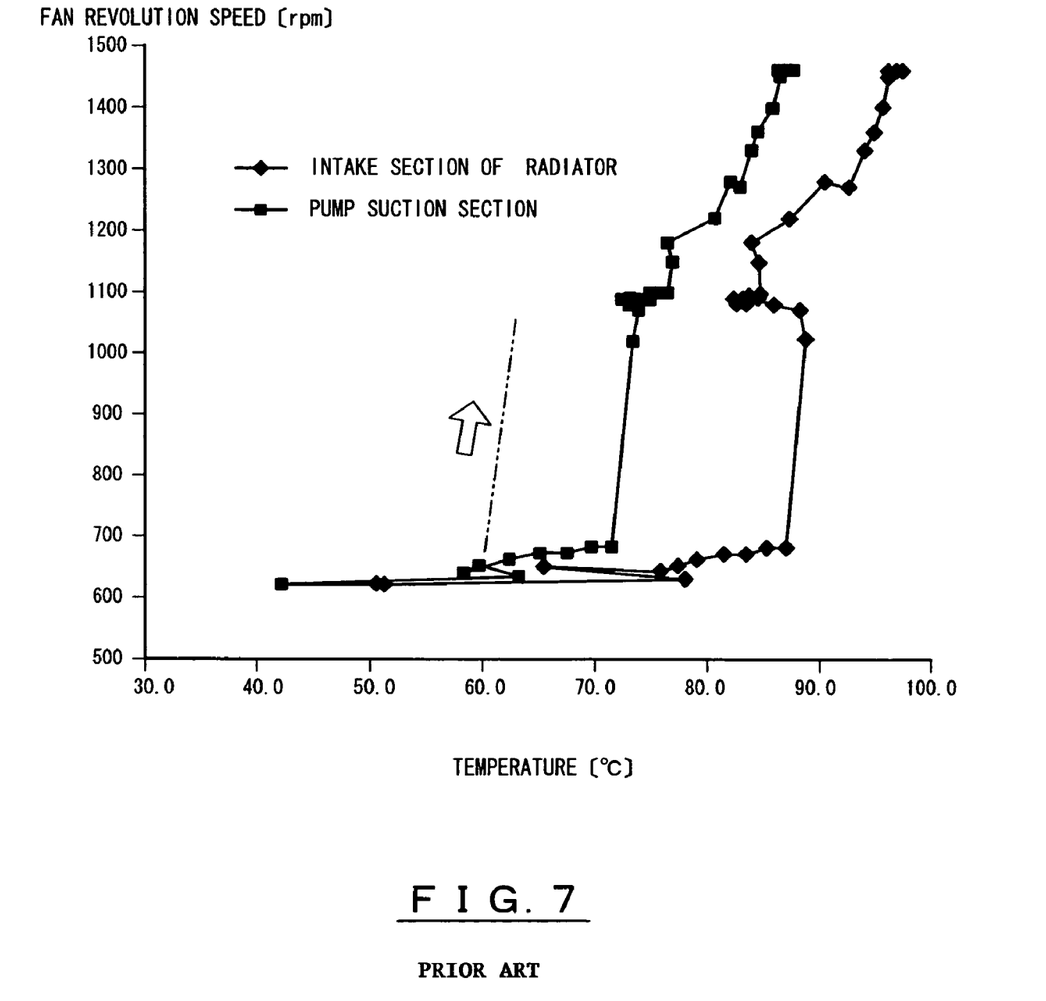
FIG. 7 is a graph showing the relationship between fan revolution speeds and temperatures at the pump suction section and the intake section of the radiator when the aforementioned conventional fan revolution speed control method is used.

During a normal course of operation, such a conventional fan revolution speed control method that calls for calculating a fan revolution speed by a system of a proportional integral control unit and changing the fan revolution speed so as to bring the actual temperature down to the target temperature presents no problem. However, as shown in FIG. 7, such a conventional method is prone to delay in rise of fan revolution speed in response to an initiation command. For example, in cases where the target temperature is 60° C., the fan revolution speed, which is shown by a two-dot chain line, does not rise immediately when the actual temperature of the cooling target fluid exceeds the target temperature of 60° C. but after the cooling target fluid greatly overshoots the target temperature. As shown in FIG. 7, the fan revolution speed may not rise until the actual temperature of the hydraulic oil, which is a cooling target fluid, at the pump suction section of a hydraulic pump exceeds 70° C., or, until the actual temperature of the coolant, which is another cooling target fluid, approaches 90° C. at the intake section of the radiator.

The aforementioned delay in rise of fan revolution speed is caused by accumulation of negative integral elements when performing integration by the proportional integral control unit.

In order to solve the above problems, an object of the invention is to provide a fan revolution speed control method that prevents delay in rise of fan revolution speed and thereby safeguards against the actual temperature overshooting the target temperature, which would otherwise cause unnecessary increase in the fan revolution speed.

DISCLOSURE OF THE INVENTION

A fan revolution speed control method according to the present invention is a method of controlling a cooling fan and comprises steps of detecting an actual temperature of a cooling target fluid that is to be cooled by the cooling fan, determining a target fan revolution speed based on the difference between the actual temperature detected and a target temperature by a system of a proportional integral control unit, and controlling the cooling fan based on the target fan revolution speed, wherein accumulation of integral elements at a negative side is restricted when performing integration by the proportional integral control unit. As accumulation of negative integral elements is restricted when the proportional integral control unit performs integration, the fan revolution speed is enabled to rise immediately when an actual temperature of the cooling target fluid, such as hydraulic oil or coolant, exceeds the corresponding target temperature. As a result of the feature described above, the method according to the invention is free from such problems as delay in rise of fan revolution speed, the actual temperature significantly overshooting the target temperature, and unnecessary increase in the fan revolution speed, which would otherwise be caused by overshooting of the actual temperature. Therefore, the method according to the invention presents various benefits, including improved fuel efficiency, improved working environment that results from reduction of noises, and improved durability of various components resulting from reduction of vibration.

A fan revolution speed control method according to another feature of the invention is similar to the fan revolution speed control method described above and further characterized in that an integration start temperature, at which integration is initiated, serves as the aforementioned target temperature so as to restrict accumulation of negative integral elements. By restricting accumulation of negative integral elements when performing integration by a proportional integral control unit until the actual temperature of a cooling target fluid reaches the corresponding target temperature, the method having this feature enables the control of the fan revolution speed so that the fan revolution speed rises immediately when the actual temperature of the cooling target fluid exceeds the target temperature.

A fan revolution speed control method according to yet another feature of the invention is similar to the fan revolution speed control method described above and further characterized in that in cases where a minimum fan revolution speed has been determined, an integration start fan revolution speed, at which integration is initiated, is set at the aforementioned minimum fan revolution speed so as to restrict accumulation of negative integral elements. By restricting accumulation of negative integral elements when performing integration by a proportional integral control unit until the fan revolution speed reaches the minimum fan revolution speed, the method having this feature enables the control of the fan revolution speed so that the fan revolution speed rises immediately when the fan revolution speed exceeds the minimum fan revolution speed.

PREFERRED EMBODIMENT OF THE INVENTION

Next, the present invention is explained hereunder, referring to an embodiment thereof shown in FIGS. 1 through 6.

Figure 6:
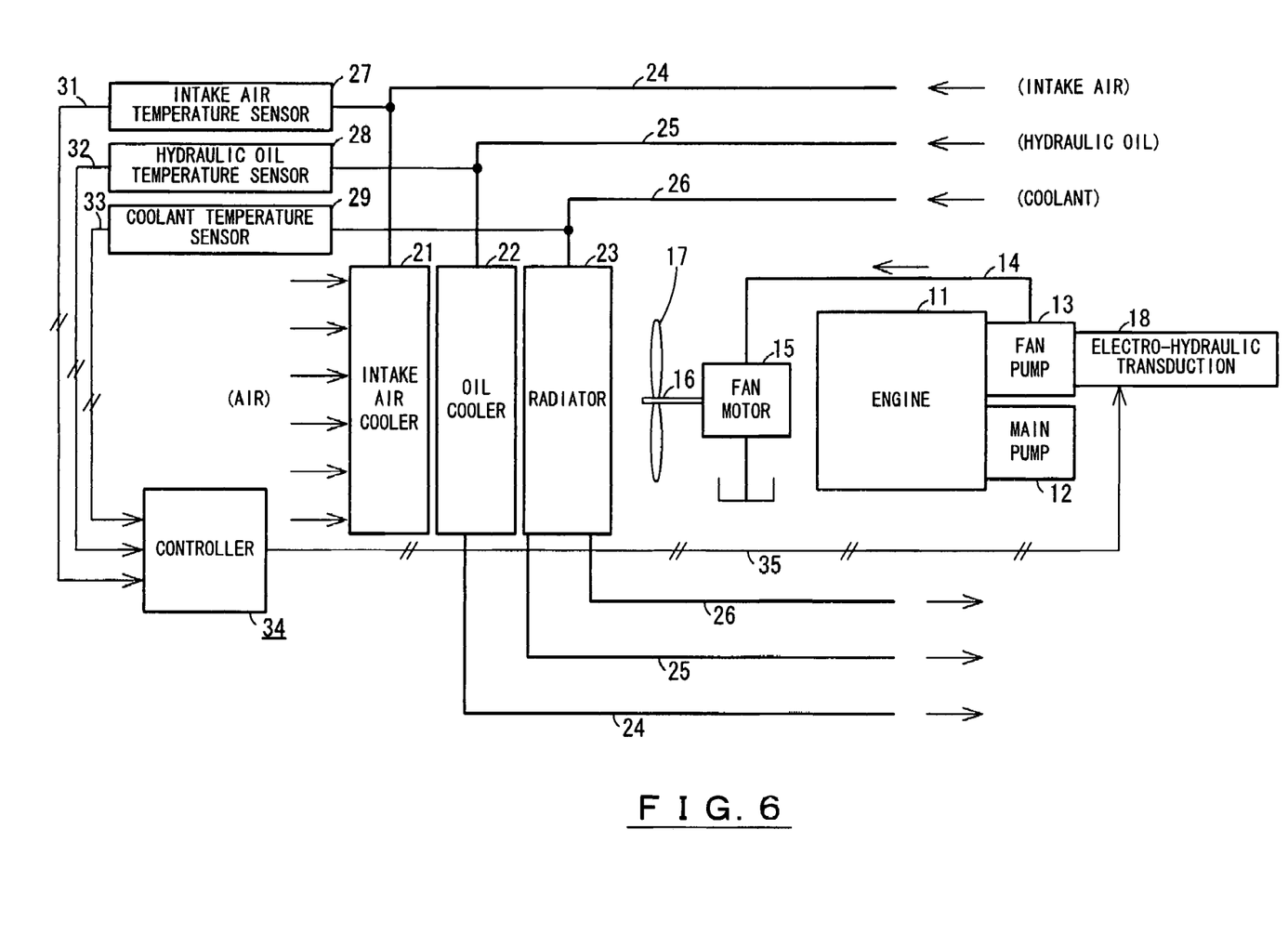
FIG. 6 is a block diagram showing an outline of a device for employing the fan revolution speed control method according to the present invention.

FIG. 6 shows an outline of a fan revolution speed control device. An engine 11, which is mounted on the motor vehicle of a construction machine, such as a hydraulic excavator, is provided with a main pump 12 for excavation or other work and a fan pump 13 and has a function of driving these pumps 12 and 13 together. The main pump 12 serves to feed hydraulic oil under pressure. The hydraulic excavator comprises an undercarriage and an upper structure. The undercarriage is provided with a traveling system, such as crawler belts. The upper structure is provided with a working unit system and rotatably mounted on the undercarriage, with a turning system disposed between the upper structure and the undercarriage. The working unit system comprises a boom, an arm, a bucket, and hydraulic cylinders for operating these components.

The main pump 12 serves to feed hydraulic fluid, i.e. hydraulic oil, to various hydraulic actuators, including hydraulic motors of the traveling system, a hydraulic motor of the turning system, and the hydraulic cylinders of the working unit system.

The fan pump 13 serves to drive a fan motor 15 by a system of hydraulic fluid that is hydraulic oil discharged into a pipe line 14. The fan motor 15 is provided with a cooling fan 17, which is integrally attached to a rotary shaft 16 of the fan motor 15 so as to be rotated by the fan motor 15.

The fan pump 13 is provided with an electro-hydraulic transducing valve 18, which is adapted to receive electrical input signals and output hydraulic signals, so that the fan pump 13 functions as a variable delivery pump to perform variable control of the rotation speed of the fan motor 15 by changing the pump discharge rate of the fan pump 13 based on hydraulic signals output from the electro-hydraulic transducing valve 18.

An intake air cooler 21, an oil cooler 22, and a radiator 23 are sequentially disposed opposite the cooling fan 17. The intake air cooler 21, the oil cooler 22, and the radiator 23 are respectively provided with an intake air pipeline 24, a hydraulic oil pipeline 25, and a coolant pipeline 26.

The intake air pipeline 24 is provided with an intake air temperature sensor 27 for detecting an actual temperature of intake air, which is a cooling target fluid. The hydraulic oil pipeline 25 is provided with a hydraulic oil temperature sensor 28 for detecting an actual temperature of hydraulic oil, which is another cooling target fluid. The coolant pipeline 26 is provided with a coolant temperature sensor 29 for detecting an actual temperature of coolant (cooling water), which is yet another cooling target fluid. These temperature sensors 27,28,29 are connected to a signal input part of a controller 34 through respective input signal lines 31,32,33.

A signal output part of the controller 34 is connected to a signal input part of the aforementioned electro-hydraulic transducing valve 18 through an output signal line 35.

The controller 34 is adapted to process actual temperatures detected by the temperature sensors 27,28,29 and output signals for the electro-hydraulic transducing valve 18 to change the pump discharge rate of the fan pump 13 based on the signals output from the controller 34, thereby controlling the fan revolution speed of the cooling fan 17 in order to bring actual temperatures of the cooling target fluids, such as the intake air, the hydraulic oil, and the coolant, which are respectively detected by the temperature sensors 27,28,29, down to the same level as the predetermined respective target temperatures. The controller 34 thus cools the cooling target fluids appropriately to prevent overheating.

As described above, the controller 34 serves to perform variable control of the fan revolution speed so that the actual temperatures of the cooling target fluids cooled by the cooling fan 17 are brought down to the respective target temperatures. Another function of the controller 34 is to reduce the revolution speed of the cooling fan 17, thereby indirectly increasing the output power of the main pump 12.

To be more specific, the fan motor 15 is operated by hydraulic oil discharged from the fan pump 13, which is driven by the engine 11 together with the main pump 12. The fan motor 15 rotates the cooling fan 17. At that time, the controller 34 can control the fan pump 13 so as to reduce the revolution speed of the cooling fan 17 so that the fan driving energy, which is consumed by the fan pump 13 and the fan motor 15, is reduced, resulting in reduction in the output power of the main pump 12 by the amount equivalent to the reduction of the fan driving energy.

Figure 1:
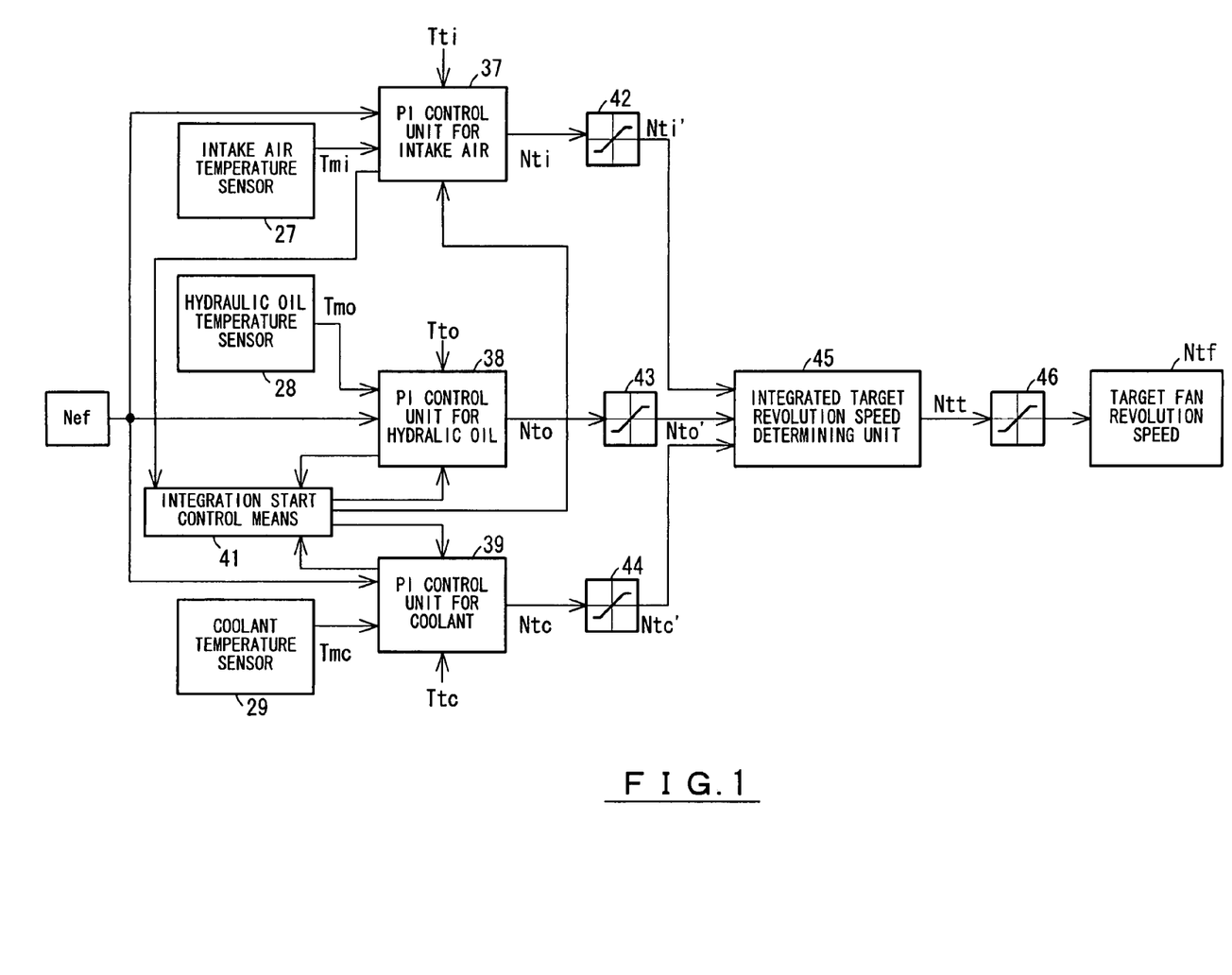
FIG. 1 is a block diagram showing an example of an algorithm for a controller for employing a fan revolution speed control method according to the present invention.

As shown in FIG. 1, the controller 34 has an algorithm to perform variable control of the fan revolution speed based on actual temperatures of the respective cooling target fluids.

Referring to FIG. 1, signals that represent various temperatures, i.e. a predetermined intake air target temperature Tti, an actual intake air temperature Tmi detected by the intake air temperature sensor 27, a predetermined hydraulic oil target temperature Tto, an actual hydraulic oil temperature Tmo detected by the hydraulic oil temperature sensor 28, a predetermined coolant target temperature Ttc, and an actual coolant temperature Tmc detected by the coolant temperature sensor 29, are input into their corresponding proportional integral control units, which are respectively provided for the different types of cooling target fluids. In the explanation hereunder, these proportional integral control units are referred to as PI control units 37,38,39.

The fan revolution speed control device is adapted to detect actual temperatures Tmi,Tmo,Tmc of the intake air, the hydraulic oil, and the coolant respectively, which are going to be cooled by the cooling fan 17, determine corresponding target fan revolution speeds Nti,Nto,Ntc by a system of the PI control units 37,38,39 based on the difference between the actual temperature Tmi,Tmo,Tmc and the target temperature Tti,Tto,Ttc of each respective cooling target fluid, and control the cooling fan 17 based on the target fan revolution speeds Nti,Nto,Ntc. The fan revolution speed control device is provided with an integration start control system 41 for restricting accumulation of negative integral elements when performing integration by the PI control units 37,38,39.

In order to restrict accumulation of negative integral elements when performing integration by the PI control units 37,38,39, the integration start control system 41 may be adapted to, for example, perform ON-OFF control exclusively on the integration function or integration outputs of the PI control units 37,38,39. By thus restricting accumulation of negative integral elements when performing integration by the PI control units 37,38,39, the integration start control system 41 enables the fan revolution speed to rise immediately when an actual temperature Tmi,Tmo,Tmc of any cooling target fluid, such as the intake air, the hydraulic oil, or the coolant, exceeds the corresponding target temperature Tti,Tto,Ttc.

The PI control units 37,38,39 serve to determine a plurality of target fan revolution speeds respectively for the various cooling target fluids, i.e. the intake air, the hydraulic oil, and the coolant, based on the calorific value and the ambient temperature of each respective cooling target fluid. Signals representing a target fan revolution speed Nti for the intake air, a target fan revolution speed Nto for the hydraulic oil, and a target fan revolution speed Ntc for the coolant, are output from the PI control units 37,38,39 respectively. Limiters 42,43,44 having saturation characteristics are provided so that each limiter 42,43,44 sets the upper and lower limits of each respective signal Nti,Nto,Ntc.

The target fan revolution speed Nti' for the intake air, the target fan revolution speed Nto' for the hydraulic oil, and the target fan revolution speed Ntc' for the coolant that have passed through the limiters 42,43,44 are input into an integrated target revolution speed determining unit 45, which determines a single integrated target revolution speed Ntt by performing calculation using these target fan revolution speeds.

The integrated target revolution speed determining unit 45 may perform the aforementioned calculation by, for example, squaring each target fan revolution speed Nti',Nto', Ntc' of each respective cooling target fluid, summing up the squared values, and calculating the root of the sum. The equation can be expressed as:

$$Ntt = \{\Sigma(\text{target fan revolution speed of each cooling target fluid } n)^2\}^{1/2} \text{ or}$$

$$Ntt = \{(Nti')^2 + (Nto')^2 + (Ntc')^2\}^{1/2}$$

Upon being passed through a limiter 46, which has saturation characteristics so as to set the upper and lower limits of each integrated target revolution speed Ntt, the integrated target revolution speed Ntt resulting from the calculation becomes the final target fan revolution speed Ntf.

FIG. 2(a) shows in detail the aforementioned PI control unit 38 for temperature of the hydraulic oil.

Referring to the drawing, a target temperature Tto and an actual temperature Tmo of the hydraulic oil are introduced to a comparator 51, which serves to calculate the difference between these temperatures. A signal value is produced by multiplying a differential signal output from the comparator 51 by a gain 52 and then setting the upper and lower limits of the resulting value by system of a limiter 53, which has saturation characteristics. Another signal value is produced by multiplying the aforementioned differential signal by a gain 54, performing integration of the resulting value by system of an integrator 55, and then setting the upper and lower limits of the resulting value by system of a limiter 53. By summing up the aforementioned signal values and an expected fan revolution speed Nef by a system of an adder 57, the aforementioned target fan revolution speed Nto for the hydraulic oil is determined.

In the same manner as above, the PI control unit 37 processes a target temperature Tti and an actual temperature Tmi of the intake air to determine a target fan revolution speed Nti for the intake air, and the PI control unit 39 processes a target temperature Ttc and an actual temperature Tmc of the coolant to determine a target fan revolution speed Ntc for the coolant.

As shown in FIGS. 2(a) and (b), the integration start control system 41 is adapted to set an integration start temperature as a target temperature in order to restrict accumulation of integral elements at the negative side. An integration start temperature is a temperature at which the integrator 55 of the PI control unit 38 initiates integration. In cases where there is a large difference between an actual temperature Tmo and a target temperature Tto when the engine is started up or in other situations where the actual temperature Tmo of the hydraulic oil is low, setting the integration start temperature as a target temperature prevents accumulation of negative integral elements during the time it takes for the actual temperature Tmo to increase to the target temperature Tto.

Figure 2:
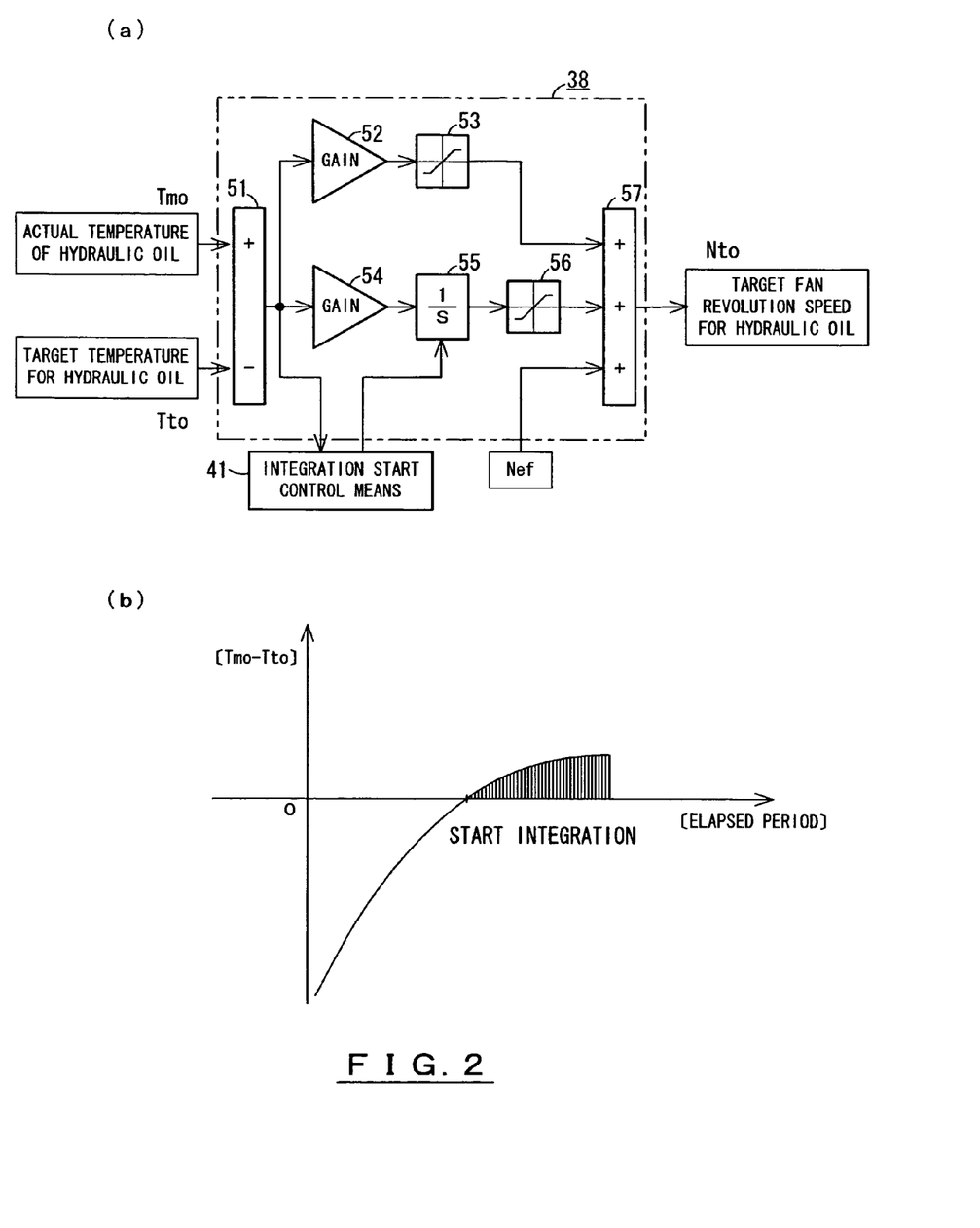
FIG. 2(a) is a block diagram of an example of a proportional integral control unit and an integration start control system of the controller.
FIG. 2(b) is a graph to explain how the integration start control system controls the timing for initiating integration.

Next, the functions and effects of the embodiment shown in FIGS. 1 and 2 are explained hereunder.

As described above, PI control unit 37,38,39 includes a comparator 51 and other necessary components. The actual temperatures of the cooling target fluids, i.e. the intake air, the hydraulic oil, and the coolant, are respectively detected by the temperature sensors 28,28,29. Based on data of these actual temperatures of the cooling target fluids and the target fan revolution speed Ntf, which is obtained by system of the PI control units 37,38,39, the limiter 46, etc., the revolution speed of the cooling fan 17 is controlled so that the actual temperature of each cooling target fluid reaches each respective target temperature.

To be more specific, information of the actual temperatures of the cooling target fluids detected by the temperature sensors 28,28,29 is constantly or periodically fed back to calculation of fan revolution speeds so that in cases where the actual temperature of any cooling target fluid from among the intake air, the hydraulic oil, and the coolant is higher than its corresponding target temperature, the target fan revolution speed Ntf is increased based on the difference in temperature so as to achieve a better cooling effect. Thus, the fan revolution speed is controlled without using a revolution speed sensor.

Should the calorific value of a cooling target fluid increase, the corresponding PI control unit 37,38,39 functions so that a higher fan revolution speed is required for the actual temperature detected by the corresponding temperature sensor 27,28,29 to reach the preset target temperature.

For example, in cases where the target temperature and the actual temperature of the hydraulic oil are 60° C. and 61° C. respectively, the fan revolution speed of the cooling fan 17 begins to increase so that the actual temperature is brought down to 60° C. If the calorific value is very small, a minimal increase in the fan revolution speed is sufficient for the actual temperature to return to 60° C. However, should the calorific value be great, a minimal increase in the fan revolution speed is not sufficient to stop the increase in the temperature of the hydraulic oil. As a result, the fan revolution speed, too, continues to increase. When the fan revolution speed eventually reaches a sufficient level, the temperature of the hydraulic oil starts to decrease. The increase in the fan revolution speed stops when the temperature of the hydraulic oil reaches the target temperature.

Furthermore, even if the conditions of the target temperature and the calorific value are the same, an increase in an ambient temperature results in a higher fan revolution speed of the cooling fan 17 as described previously.

As explained above, a value to which the fan revolution speed is controlled is determined based on the calorific value and the ambient temperature of each respective cooling target fluid. In other words, a feature of the control method according to the present embodiment lies in the absence of a map specifying each temperature and its corresponding fan revolution speeds.

In cases where the integrated target revolution speed determining unit 45 calculates an integrated target revolution speed Ntt based on the equation Ntt=$\{\Sigma(\text{target fan revolution speed of each cooling target fluid n})^2\}^{1/2}$, the integrated target revolution speed Ntt inevitably increases, when the fan revolution speed of any cooling target fluid increases.

For example, when the target revolution speeds determined based on the temperatures of the intake air, the coolant (cooling water), and the hydraulic oil are 300 rpm, 500 rpm, and 700 rpm respectively, the integrated target revolution speed Ntt is 911 rpm. Under these conditions, when the target revolution speed determined by the coolant temperature increases from 500 rpm to 600 rpm, the integrated target revolution speed Ntt becomes 970 rpm.

Should the integrated target revolution speed be determined from the equation of Integrated target revolution speed=Maximum value (Fan revolution speed of cooling target fluid n), the integrated target revolution speed is 700 rpm regardless of whether the target revolution speed determined by the coolant temperature is 500 rpm or 600 rpm. In other words, the integrated target revolution speed remains unchanged regardless of the increasing calorific value of the entire system.

As described above, one of the features of the integrated target revolution speed determining unit 45 lies in that the integrated target revolution speed Ntt changes when the temperature of any one of the cooling target fluids changes.

In cases where the hydraulic oil used in a vehicle, such as a hydraulic excavator, is cool and does not require reduction of the temperature, the electro-hydraulic transducing valve 18 reduces the flow rate of the hydraulic oil discharged from the fan pump 13 in order to reduce the fan revolution speed of the cooling fan 17. At that time, as the fan driving power of the engine 11 required by the fan pump 13 has decreased, the output of the main pump 12, which, too, is driven by the engine 11, can be increased by an equivalent proportion. The method described above thus enables the effective use of the output of the engine 11. Furthermore, the decrease in the fan revolution speed reduces noises of the cooling fan 17.

The integrator 55 is controlled by the integration start control system 41 so that, as shown in FIG. 2(*b*), when the actual temperature Tmo of the hydraulic oil is lower than the target temperature Tto, accumulation of integral elements at the negative side is restricted. When the actual temperature Tmo of the hydraulic oil exceeds the target temperature Tto, accumulation of integral elements at the negative side as well as at the positive side is initiated, and the target fan revolution speed Nto for the hydraulic oil is determined by proportional integral control.

To be more specific, if the actual temperature Tmo of the hydraulic oil does not reach the target temperature Tto when the engine 11 starts up, proportional elements, such as the gain 52 of the PI control unit 38, alone are used to determine the target fan revolution speed Nto based on the difference between the actual temperature Tmo and the target temperature Tto. When the actual temperature Tmo of the hydraulic oil exceeds the target temperature Tto, integral elements of the integrator 55 as well as proportional elements, such as the gains 52,54 of the PI control unit 38, are used to determine the target fan revolution speed Nto based on the difference between the actual temperature Tmo and the target temperature Tto.

The same procedure is followed in cases where the cooling target fluid is the intake air or the coolant; the timing for initiating integral calculation is controlled in a similar manner, for determining the target fan revolution speed Nti for the intake air or the target fan revolution speed Ntc for the coolant.

To summarize, as the integrator 55 of each PI control unit 37,38,39 is prevented from functioning during the period the actual temperature Tmi,Tmo,Tmc of the corresponding cooling target fluid is reaching the target temperature Tti, Tto,Ttc at the start-up of the engine or in a similar situation, the control method of the invention is free from the problem of accumulation of negative integral elements and is therefore capable of preventing delay in rise of fan revolution speed and, consequently, preventing the actual temperature Tmi,Tmo,Tmc from overshooting the target temperature Tti,Tto,Ttc. As a result of the prevention of overshooting of the temperatures, unnecessary increase in the fan revolution speed, too, can be prevented.

Figure 3:
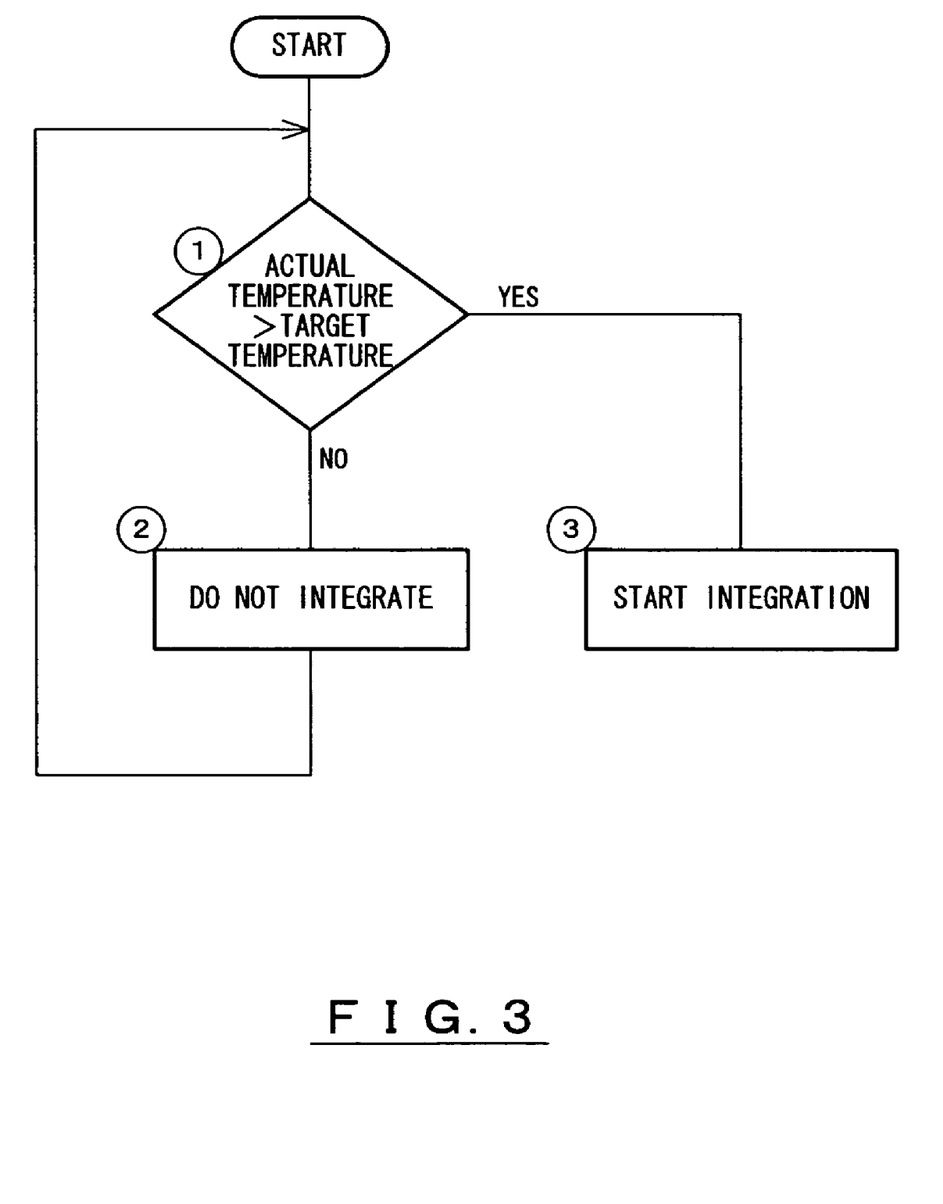
FIG. 3 is a flow chart to explain how the integration start control system shown in FIG. 2 performs control.

Next, FIG. 3 is a flow chart to explain how the integration start control system 41 performs control. The control begins with determining whether the actual temperature Tmi,Tmo, Tmc of the intake air, the hydraulic oil, or the coolant is higher than the corresponding target temperature Tti,Tto,Ttc at the start-up of the engine (Step 1). If the actual temperature is lower (NO in Step 1), an integration restriction signal is transmitted from the integration start control system 41 to the integrator 55 so that the integrator 55 is not activated (Step 2).

When the actual temperature Tmi,Tmo,Tmc of the intake air, the hydraulic oil, or the coolant increases to a level higher than the corresponding target temperature Tti,Tto,Ttc (YES in Step 1), transmission of the integration limiting signal from the integration start control system 41 to the integrator 55 is stopped so that the integrator 55 initiates integration (Step 3).

In other words, in cases where the actual temperature Tmi,Tmo,Tmc of the intake air, the hydraulic oil, or the coolant is lower than the corresponding target temperature Tti,Tto,Ttc at the start-up of the engine, the target temperature Tti,Tto,Ttc serves as the integration start temperature so as to prevent accumulation of negative integral elements until the actual temperature Tmi,Tmo,Tmc reaches the target temperature Tti,Tto,Ttc.

As a result, at the moment when the actual temperature Tmi,Tmo,Tmc of the intake air, the hydraulic oil, or the coolant reaches its corresponding target temperature Tti,Tto, Ttc, PI control is activated so that the target temperature Tti,Tto,Ttc is constantly maintained by system of normal variable control of the cooling fan.

As described above, by restraining accumulation of negative integral elements when performing integration by the PI control units 37,38,39 until the actual temperatures Tmi, Tmo,Tmc of the cooling target fluids reach their respective target temperatures Tti,Tto,Ttc, the control method according to the invention enables the control of the fan revolution speed so that the fan revolution speed rises immediately when the actual temperature Tmi,Tmo,Tmc of any of the cooling target fluids exceeds the corresponding target temperature Tti,Tto,Ttc.

Therefore, when the actual temperature Tmi,Tmo,Tmc of any of the cooling target fluids exceeds the corresponding target temperature Tti,Tto,Ttc at the start-up of the engine, the fan revolution speed increases without delay so that the actual temperature Tmi,Tmo,Tmc can be quickly regulated at the target temperature Tti,Tto,Ttc with overshooting of the actual temperature limited to an absolute minimum.

Should the actual temperature Tmi,Tmo,Tmc of the intake air, the hydraulic oil, or the coolant already be so high as to have reached the corresponding target temperature Tti,Tto, Ttc at the start-up of the engine, the actual temperature has already reached the integration start temperature so that normal PI control is immediately performed to achieve the target temperature Tti,Tto,Ttc. Therefore, no problems arise under such conditions.

Next, the procedure of the fan revolution speed control method when the PI control units 37,38,39 are functioning is sequentially explained.

(1) The temperatures of the intake air, the hydraulic oil, and the coolant (cooling water) of the engine 11 are respectively detected by the temperature sensors 27,28, 29.

(2) The difference between the target temperature of each cooling target fluid, which is set in the controller 34 beforehand, and its corresponding actual temperature detected by each respective temperature sensor 27,28, 29 is calculated by the comparator 51 of the corresponding PI control unit 37,38,39. Then, proportional integral control is performed on each calculated difference by using the gains 52,54 and the integrator 55.

(3) As a result of the PI control described above, the target fan revolution speeds Nti,Nto,Ntc of the respective cooling target fluids are determined. With these target fan revolution speeds input through the limiters 42,43, 44, the target fan revolution speeds Nti',Nto',Ntc' are determined.

(4) The integrated target revolution speed determining unit 45 determines a single integrated target revolution speed Ntt from the plurality of target fan revolution speeds Nti',Nto',Ntc'. In the case of the present embodiment, the integrated target revolution speed is determined by calculation that uses the equation Ntt={Σ (target fan revolution speed of each cooling target fluid n)$^2$}$^{1/2}$. As described later, however, the method of calculation is not limited to this equation.

With the integrated target revolution speed Ntt input through the limiter 46, the final target fan revolution speed Ntf is determined.

(5) By driving the electro-hydraulic transducing valve 18 so as to achieve the target fan revolution speed Ntf, the controller 34 controls the pump discharge rate of the fan pump 13, thereby controlling the number of revolutions of the fan motor 15. Thus, the fan revolution speed of the cooling fan 17 is controlled.

(6) In order for the actual temperatures of the cooling target fluids to reach the respective target temperature, the process returns to (2) described above and continues feedback control.

As described above, the fan revolution speed control method according to the invention does not call for detecting a fan revolution speed by a system of a revolution speed sensor or the like to perform feedback control of the fan revolution speed. As it calls for feedback of temperatures detected by the temperature sensors for the respective cooling target fluids, a fan revolution speed in an absolute value is not important.

As the value at which the fan revolution speed of each cooling target fluid is regulated varies depending on the calorific value and the ambient temperature of the cooling target fluid, target fan revolution speeds are respectively set for the cooling target fluids, and a calculating method for determining a single integrated target revolution speed based on these target fan revolution speeds is provided.

When the temperature of a cooling target fluid is low, the fan revolution speed is reduced so that the power required to drive the fan is reduced. Therefore, the hydraulic output of the main pump can be increased by the equivalent amount.

As control operates to bring the actual temperatures of the cooling target fluids to reach the respective target temperatures, the temperatures of the hydraulic oil and the cooling water rise faster in winter. When the temperature of such a cooling target fluid as hydraulic oil changes, its viscosity, too, fluctuates. Therefore, the faster the rise in the temperature of the cooling target fluid, the faster its viscosity becomes stable. As a result, the fluctuation in the responding time caused by the difference in the viscosity of the cooling target fluid, such as the hydraulic oil, is limited to a minimum, enabling the engine to function at a more stable temperature.

The above description which states "control is performed so as to bring the actual temperatures of the cooling target fluids to reach the respective target temperatures" includes cases where the cooling fan is brought to a standstill or driven at a minimum fan revolution speed by controlling the discharge rate of the fan pump 13 to 0 or a minimum amount by the system of the electro-hydraulic transducing valve 18 immediately after start-up of the engine in winter or under other similar conditions.

The method of calculation for the integrated target revolution speed determining unit 45 to determine an integrated target revolution speed Ntt is not limited to the one described above.

For example, the calculation may be performed by using a weighting factor Wn ($0 \leq Wn \leq 1$, $\Sigma Wn=1$) in the equation:

Integrated target revolution speed $Ntt=\Sigma\{Wn\times(\text{target fan revolution speed of cooling target fluid } n)\}$ The proportional integral control units that can be used for the invention are not limited to the PI control units described above and include proportional integral and differential control units (PID control units), which are widely used. Normal PID control units can be used without a problem.

Figure 4:
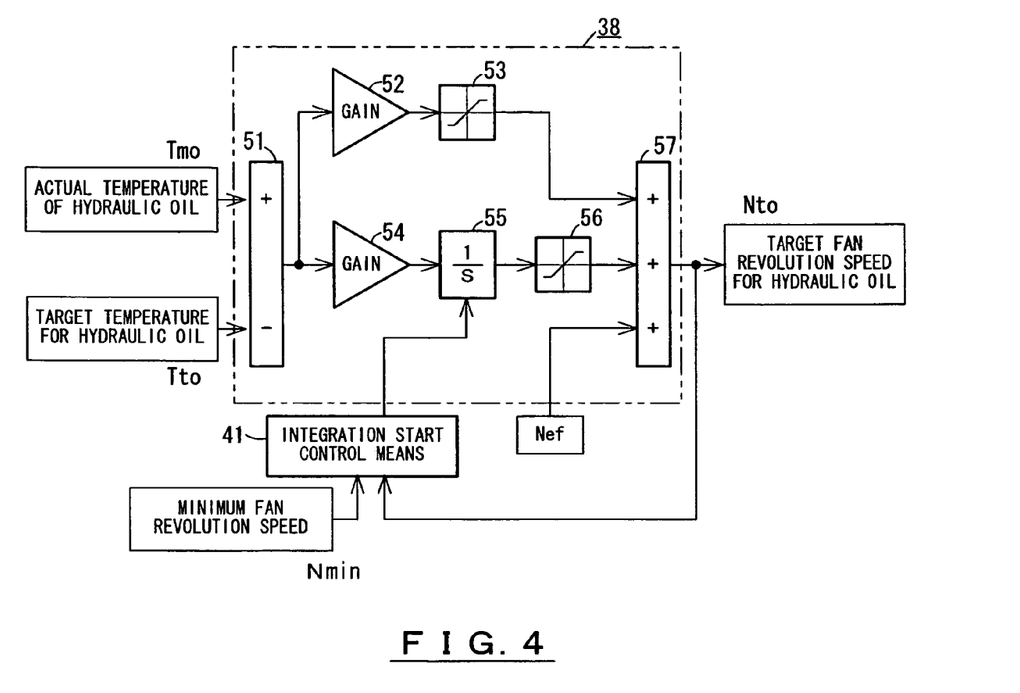
FIG. 4 is a block diagram of another example of a proportional integral control unit and an integration start control system of the controller.
Figure 5:
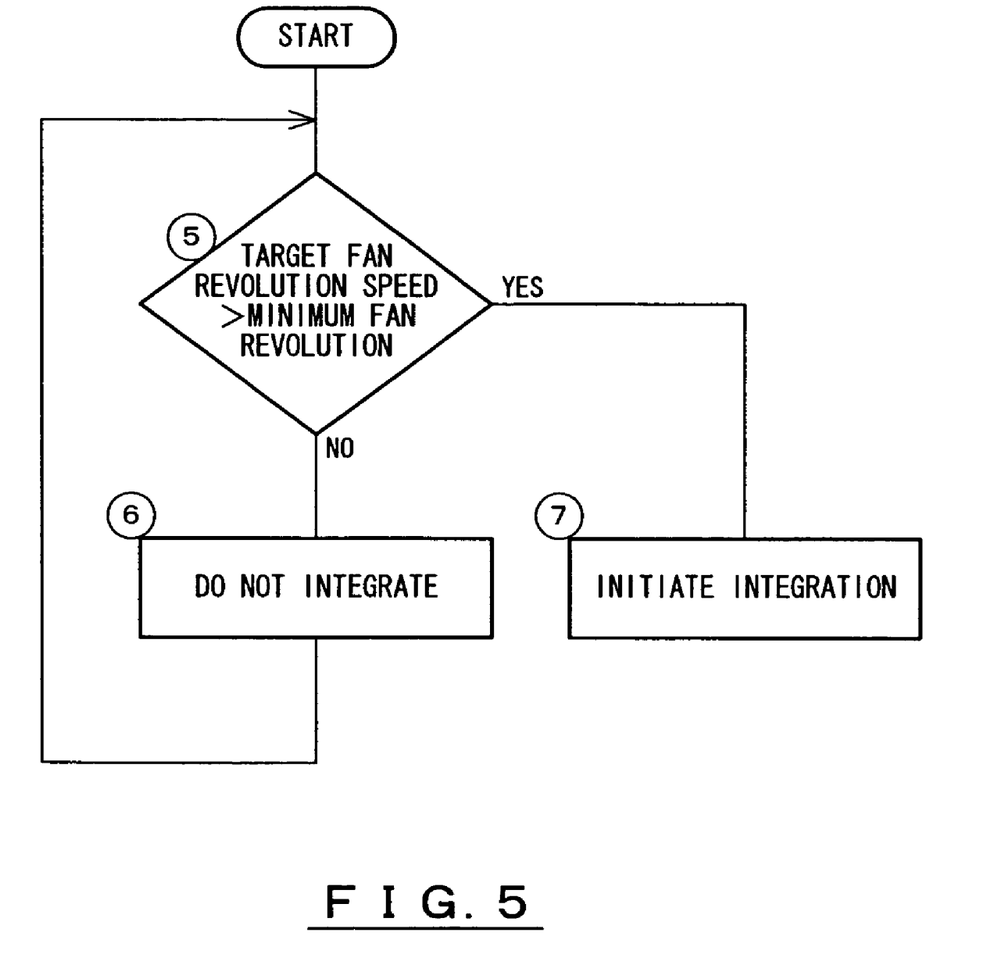
FIG. 5 is a flow chart to explain how the integration start control system shown in FIG. 4 performs control.

As described above, the integration start control system 41 serves to restrict accumulation of negative integral elements when performing integration by the PI control unit 38. FIGS. 4 and 5 illustrate an integration start control system 41 according to another embodiment of the invention. The method according to the present embodiment calls for setting a fan revolution speed at which integration is initiated instead of setting the aforementioned integration start temperatures as the respective target temperatures.

To be more specific, in cases where a minimum fan revolution speed Nmin has been set, accumulation of integral elements at the negative side is restricted by setting the minimum fan revolution speed Nmin as the integration start fan revolution speed, at which the integrator 55 of the PI control unit 38 initiates integration.

For example, if the target fan revolution speed Nto of the hydraulic oil does not reach the minimum fan revolution speed Nmin at the start-up of the engine or in a similar occasion, the target fan revolution speed Nto is determined based on the difference between the actual temperature Tmo and the target temperature Tto by using exclusively the gain 52 of the PI control unit 38, in other words proportional elements. When the target fan revolution speed Nto exceeds the minimum fan revolution speed Nmin, the target fan revolution speed Nto is determined based on the difference between the actual temperature Tmo and the target temperature Tto by using integral elements, i.e. the integrator 55, as well as proportional elements, i.e. the gains 52,54 of the PI control unit 38. The same procedure is followed when determining the target fan revolution speed Ntc of the coolant.

More specifically, reference is made in the present embodiment to a case where a minimum fan revolution speed Nmin has been set. As shown in FIG. 5, judgment is made as to whether each target fan revolution speed Nti, Nto,Ntc, which corresponds to the actual temperature Tmi, Tmo,Tmc of each respective cooling target fluid, i.e. the intake air, the hydraulic oil, or the coolant, is higher than the minimum fan revolution speed Nmin (Step 5). Should any target fan revolution speed Nti,Nto,Ntc be lower than the minimum fan revolution speed Nmin (NO in Step 5), the corresponding integrator 55 is turned off to prevent accumulation of negative integral elements (Step 6). When the target fan revolution speed Nti,Nto,Ntc exceeds the minimum fan revolution speed Nmin (YES in Step 5), the corresponding integrator 55 is activated so as to initiate accumulation of integral elements at the positive and negative sides in the integration by the corresponding PI control unit 37,38,39 (Step 7).

By thus setting the integration start fan revolution speed at the minimum fan revolution speed Nmin, integral elements are kept invalid until the target fan revolution speed Nti,Nto,Ntc that corresponds to the target temperature of the cooling target fluid reaches the minimum fan revolution speed Nmin so that negative integral elements are not accumulated in the PI control unit 37,38,39. From the point when the target fan revolution speed Nti,Nto,Ntc that corresponds to the target temperature exceeds the minimum fan revolution speed Nmin, positive and negative integral elements are accumulated.

As a result, the fan revolution speed rises immediately when the fan revolution speed reaches the minimum fan revolution speed Nmin so that the fan revolution speed increases smoothly, without delay, to reach the target fan revolution speed Nti,Nto,Ntc.

Once an integrator 55 is activated at the moment when the actual temperature Tmi,Tmo,Tmc of the corresponding cooling target fluid, i.e. the intake air, the hydraulic oil, or the coolant, exceeds the corresponding target temperature Tti,Tto,Ttc or when the corresponding target fan revolution speed Nti,Nto,Ntc exceeds the minimum fan revolution speed Nmin, both positive integral elements and negative integral elements are activated. As a result, at the point when the integral value crosses into the positive side, the temperature decreases due to the positive integral elements and, thereafter, continues to decrease. Should the temperature become lower than the target temperature, the temperature is increased to the target temperature because of the function of the negative integral elements. As described above, the moment when integration is initiated, both positive integral elements and negative integral elements are activated so that the temperature is regulated at the target temperature.

As described above, restricting accumulation of negative integral elements when performing integration by each PI control unit 37,38,39 prevents delay in rise of fan revolution speed and, consequently, prevents the actual temperature from significantly overshooting the target temperature. As a result, unnecessary increase in the fan revolution speed, which would otherwise be caused by overshooting of the actual temperature, is prevented.

As the reduction of overshoot of an actual temperature prevents an excessive increase in the fan revolution speed, the fuel consumption is reduced, resulting in a better fuel efficiency.

Another effect of prevention of an excessive increase in a fan revolution speed lies in reduction of noise produced by the revolution of the fan, alleviating discomfort for an operator of a construction machine, such as a hydraulic excavator, resulting in an improved working environment.

Yet another effect of prevention of an excessive increase in a fan revolution speed lies in reduction of vibration produced by the revolution of the fan, resulting in improved durability of various components and other benefits.

POSSIBLE INDUSTRIAL APPLICATION

The present invention is applicable to not only a construction machine, such as a hydraulic excavator, but also any other work machine that requires control of the fan revolution speed of its cooling fan.

The invention claimed is:

1. A fan revolution speed control method comprising the steps of:
    detecting an actual temperature of a cooling target fluid that is to be cooled by a cooling fan,
    determining a target fan revolution speed based on the difference between the actual temperature detected and a target temperature by a proportional integral control unit, and
    controlling said cooling fan based on said target fan revolution speed, wherein:
    restricting an accumulation of integral elements at a negative side when performing integration by said proportional integral control unit.

2. A fan revolution speed control method as claimed in claim 1, wherein:
    an integration start temperature, at which integration is initiated, serves as said target temperature so as to restrict accumulation of negative integral elements.

3. A fan revolution speed control method as claimed in claim 1, wherein:
    a minimum fan revolution speed has been determined, and an integration start fan revolution speed, at which integration is initiated, is set at said minimum fan revolution speed so as to restrict accumulation of negative integral elements.

* * * * *